June 30, 1953  W. A. HARPER ET AL  2,643,505
CAGE FOR SIDE DELIVERY RAKES
Filed June 29, 1950
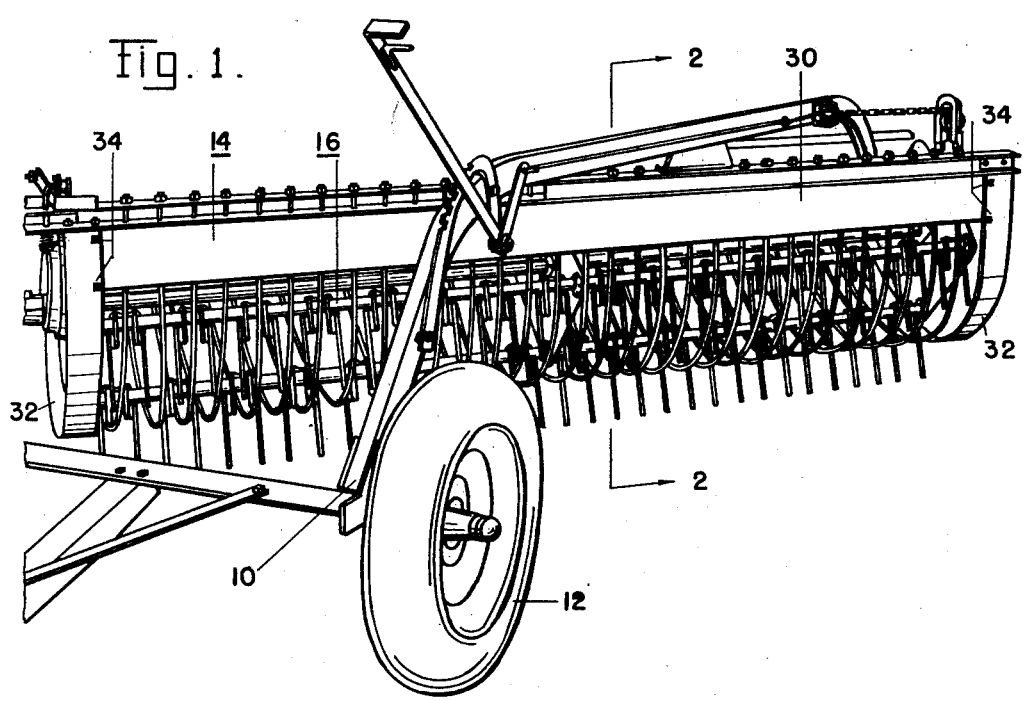
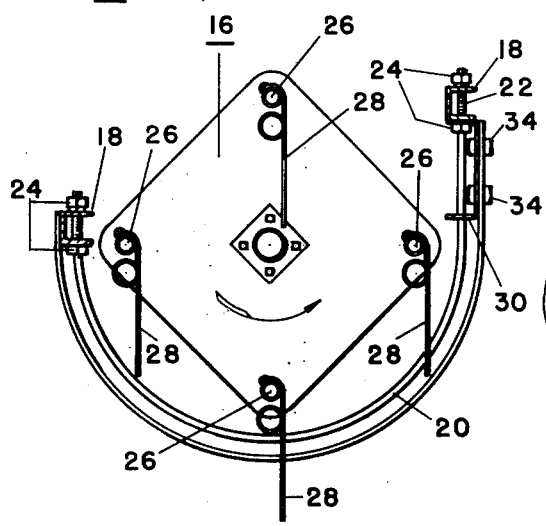
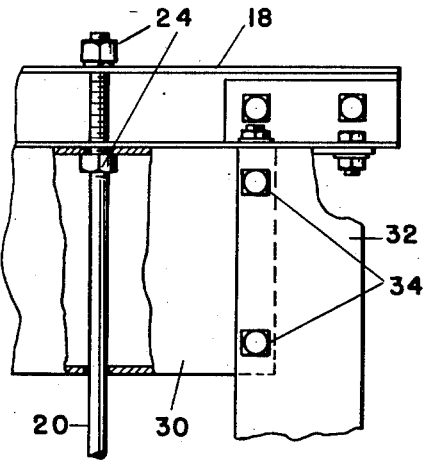
INVENTOR
WESLEY A. HARPER
E. S. MINTON
By *Toulmin & Toulmin*
ATTORNEYS.

Patented June 30, 1953

2,643,505

UNITED STATES PATENT OFFICE 2,643,505

CAGE FOR SIDE DELIVERY RAKES

Wesley A. Harper and Eugene S. Minton, Bellevue, Ohio, assignors, by mesne assignments, to Cockshutt Farm Equipment Incorporated, a corporation of Delaware Application June 29, 1950, Serial No. 171,092

2 Claims. (Cl. 56—377)

This invention relates to a side delivery rake construction, and particularly to improvements therein for increasing the operating efficiency of the rakes, and for giving them greater strength.

Side delivery rakes are well known in the art and are employed for the purpose of windrowing hay and similar mowed products to facilitate the gathering thereof to transfer the crop to storage. Rakes of this nature comprise a frame having ground wheels which are drawn across the field by a suitable draft means. The frame supports a shield or cage arrangement consisting of a plurality of arcuate stripper rods and within this cage is rotatably mounted a reel mechanism that has tines that project outwardly between the curved stripper rods and roll the hay, or other crop being gathered, forwardly of the cage as the rake moves.

Due to the operation of the reel and to the fact that the fields over which the rakes are moved are sometimes irregular, the stripper rods are subjected to considerable strain by the hay pushing backwardly thereon and this strain is more or less vibratory in nature.

Accordingly, heretofore, the curved stripper rods have had a tendency to become weakened and break where they are secured to the frame of the cage. This difficulty is not satisfactorily overcome merely by making the stripper rods heavier because this increases the weight of the rake and likewise increases the expense thereof.

Another disadvantage that has been observed in connection with side delivery rakes is that there is a tendency for some of the hay, or other crop being gathered, to get inside the cage structure. This may be due to the fact that a heavy crop is being gathered which causes the hay to roll up to a higher level in front of the cage, or may be due to the wind conditions which tend to blow off some of the hay and to carry it between the stripper rods to the inside of the cage.

With the foregoing difficulties in mind, it is a primary object of this invention to provide an improved side delivery rake construction which eliminates the difficulties referred to above.

It is also an object of this invention to provide an improved side delivery rake construction in which breakage of the stripper rods is substantially eliminated.

A still further object is the provision of a side delivery rake in which the interior of the cage is shielded from loose particles of the material being gathered so that the cage stays clear of such matter internally at all times.

It is also an object to provide a side delivery rake construction having stripper rods which are substantially stronger against breakage than former stripper rods but in which the added strength is imparted to the rods without materially increasing the weight of the rake.

These and other objects and advantages will become more apparent upon reference to the following description taken in connection with the accompanying drawings in which:

Figure 1 is a perspective view of a side delivery rake embodying the instant invention;

Figure 2 is a cross-sectional view taken through the rake as indicated by line 2—2—2 on Figure 1; and Figure 3 is an enlarged fragmentary front view taken at one end of the rake showing the arrangement thereof.

Referring to the drawings somewhat more in detail, a side delivery rake of the type with which this invention is concerned is illustrated in perspective in Figure 1 and will be seen to comprise a supporting frame 10 having ground wheels as at 12. The supporting frame carries a cage 14 within which is rotatable the reel structure 16. Cage 14, as will best be seen in Figure 2, comprises the longitudinally extending channel frame members 18 and a plurality of arcuate stripper rods 20 extending therebetween, the stripper rods being formed so as to define a semi-cylindrical space for receiving the reel structure 16. The ends of the stripper rods are threaded, as at 22, and are adapted for receiving the nuts 24 for securing the ends of the rods to the frame members 18.

The reel structure 16, as will be seen in Figure 2, includes a plurality of shafts 26 having thereon the tines 28 which project outwardly between the stripper rods and roll the crop being gathered ahead of the cage.

According to this invention, the front side of the cage is shielded so the material will not fall into the inside of the cage or be blown therein by means of a channel member 30. This member 30 extends the length of the cage, as will be seen in Figure 1, and has its legs apertured for receiving the stripper rods 20. The upper leg of member 30 is clamped against front frame member 18 by the lower one of the nuts 24 on the stripper rods. The ends of member 30 are secured to the end frame members 32 of the cage frame as by the bolts 34. It will be evident that member 30 is substantially rigid with the frame of the cage and will provide an effective shield across the upper portion of the cage to prevent foreign matter from getting into the inside of the cage.

At the same time, inasmuch as the lower leg of the channel member 30 embraces the stripper rods 20, it will provide support therefor which effectively increases the strength of the rods. This comes about because the support provided for the stripper rods by the member 30 is remote from the point where the rods are engaged and supported by the front frame member 18. Thus, whereas heretofore, all of the strain imposed on the stripper rods by the material being rolled up in front of the cage was carried by the said rods at the point where they joined with front frame member 18, this strain is now at least partly carried by member 30, and at an advantage of sufficient leverage that the former high unit stresses imposed on the stripper rods are materially reduced. As is well known, such a substantial reduction in unit stresses imposed on a metal member will greatly increase its working life. In the present instance, the stripper rods will last many times as long when supported according to this invention and should, in many cases, last for the life of the rake.

At the same time, the beneficial shielding effects of member 30 are obtained so that a cleaner running, more efficiently operated organization obtains. Inasmuch as member 30 is tightly clamped to the adjacent frame member 18, and is formed to a channel shape so as to be relatively stiff, it is not necessary to construct it of heavy metal, and, therefore, the overall weight of the rake is not materially increased by the addition of this member.

For the same reasons, and because it is specially constructed to be easily assembled with the rake, the addition of member 30 does not materially increase the cost of manufacture or assembly of the rake.

It will be understood that this invention is susceptible to modification in order to adapt it to different usages and conditions and, accordingly, it is desired to comprehend such modifications within this invention as may fall within the scope of the appended claims.

We claim:

1. In a side delivery rake; a reel cage comprising spaced front and rear frame members extending the length of the cage, a plurality of curved U-shaped stripper rods having their opposite ends extending through and secured to said frame members respectively, and a combination shield and supporting member comprising a channel shaped element having its legs apertured for receiving said stripper rods, and arranged with its upper leg abutting the underneath side of one of said front frame members with the rods extending through the apertures in said legs, nuts on the rods on the upper side of said last-named member and on the under side of said upper leg of said channel-shaped member for clamping the rods and said element rigidly to said front frame member, and said element having its web positioned in front of the stripper rods with the rods passing through the apertures in the lower leg.

2. In a side delivery rake: a reel cage comprising spaced front and rear frame members extending the length of the cage, a plurality of curved U-shaped stripper rods having their opposite ends extending through and secured to said frame members respectively, and a combination shield and supporting member comprising a channel-shaped element having its legs apertured for receiving said stripper rods, and arranged with its upper leg abutting the underneath side of one of said front frame members wtih the rods extending through the apertures in said legs, nuts on the rods on the upper side of said last-named member and on the under side of said upper leg of said channel-shaped member for clamping the rods and said element rigidly to said front frame member, and said element having its web positioned in front of the stripper rods with the rods passing through the apertures in the lower leg, each of said stripper rods being threaded at their opposite ends for receiving fastening means to secure said ends of the rod to said frame members.

WESLEY A. HARPER.
EUGENE S. MINTON.

References Cited in the file of this patent

FOREIGN PATENTS

| Number | Country | Date |
|---|---|---|
| 757,761 | France | Oct 16, 1933 |